United States Patent
Lee et al.

(10) Patent No.: US 9,867,119 B2
(45) Date of Patent: Jan. 9, 2018

(54) METHOD AND APPARATUS FOR PERFORMING D2D SPECIFIC ACCESS CONTROL IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/126,262

(22) PCT Filed: Mar. 30, 2015

(86) PCT No.: PCT/KR2015/003114
§ 371 (c)(1),
(2) Date: Sep. 14, 2016

(87) PCT Pub. No.: WO2015/147612
PCT Pub. Date: Oct. 1, 2015

(65) Prior Publication Data
US 2017/0094586 A1    Mar. 30, 2017

Related U.S. Application Data

(60) Provisional application No. 61/971,547, filed on Mar. 28, 2014.

(51) Int. Cl.
*H04W 4/00* (2009.01)
*H04W 48/08* (2009.01)
(Continued)

(52) U.S. Cl.
CPC ........... *H04W 48/08* (2013.01); *H04W 8/005* (2013.01); *H04W 48/02* (2013.01); *H04W 92/18* (2013.01)

(58) Field of Classification Search
CPC ... H04W 8/005; H04W 48/02; H04W 76/023; H04W 92/18; H04W 76/046; H04W 48/08; H04W 48/12; H04W 4/008; H04W 74/00; H04W 48/06; H04W 72/1284; H04W 72/14; H04W 74/002; H04W 28/0289; H04W 28/06; H04W 16/32; H04W 36/20; H04W 72/0453; H04W 72/082; H04W 16/10; H04W 16/24; H04W 36/30; H04W 4/021; H04W 28/18; H04W 4/023;
(Continued)

(56) References Cited

U.S. PATENT DOCUMENTS

2011/0106952 A1*  5/2011  Doppler ............ H04W 72/0406
                                                         709/226
2013/0039274 A1    2/2013  Lee
(Continued)

*Primary Examiner* — Nimesh Patel
(74) *Attorney, Agent, or Firm* — Lee, Hong, Degerman, Kang & Waimey

(57) ABSTRACT

A method and apparatus for performing a device-to-device (D2D) specific access control in a wireless communication system is provided. A user equipment (UE) receives D2D specific barring parameters from a network, and checks whether access to a cell is allowed according to the received D2D specific barring parameters. The D2D specific barring parameters may include a D2D specific barring factor and a D2D specific barring time.

10 Claims, 10 Drawing Sheets

(51) Int. Cl.
*H04W 48/02* (2009.01)
*H04W 8/00* (2009.01)
*H04W 92/18* (2009.01)

(58) Field of Classification Search
CPC ... H04W 64/00; H04W 72/085; H04W 88/04;
H04W 48/16; H04W 76/02; H04W 4/005;
H04W 4/08; H04W 12/08; H04W 88/02;
G01S 19/42; G01S 2205/008; G01S
5/0215; H04L 12/00; H04L 67/16; H04B
7/2606; H04B 7/026; H04B 7/15507;
H04B 7/15
See application file for complete search history.

(56) References Cited

U.S. PATENT DOCUMENTS

| | | | |
|---|---|---|---|
| 2013/0045706 A1* | 2/2013 | Hsu | H04W 4/005 455/404.1 |
| 2013/0107778 A1 | 5/2013 | Ryu et al. | |
| 2013/0121225 A1* | 5/2013 | Ryu | H04W 52/0229 370/311 |
| 2014/0011505 A1 | 1/2014 | Liao | |
| 2014/0066082 A1 | 3/2014 | Anchan et al. | |
| 2016/0037322 A1* | 2/2016 | Nguyen | H04W 8/005 370/329 |
| 2016/0345357 A1* | 11/2016 | Fan | H04W 74/006 |

\* cited by examiner

METHOD AND APPARATUS FOR PERFORMING D2D SPECIFIC ACCESS CONTROL IN WIRELESS COMMUNICATION SYSTEM

CROSS-REFERENCE TO RELATED APPLICATIONS

This application is the National Stage filing under 35 U.S.C.371 of International Application No. PCT/KR2015/003114, filed on Mar. 30, 2015, which claims the benefit of U.S. Provisional Application No. 61/971,547, filed on Mar. 28, 2014, the contents of which are all hereby incorporated by reference herein in their entirety.

BACKGROUND OF THE INVENTION

Field of the Invention

The present invention relates to wireless communications, and more particularly, to a method and apparatus for performing a device-to-device (D2D) specific access control in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not avail able. This essential direct mode feature is currently missing in LTE.

As a part of ProSe, device-to-device (D2D) operation between UEs has been discussed. Before the D2D operation is performed, various kinds of access control to a cell may be performed. In this case, a method for defining D2D specific access control may be required.

SUMMARY OF THE INVENTION

The present invention provides a method and apparatus for performing a device-to-device (D2D) specific access control in a wireless communication system. The present invention provides a method for defining D2D specific barring parameters.

In an aspect, a method for performing, by a user equipment (UE), a device-to-device (D2D) specific access control in a wireless communication system is provided. The method includes receiving, by the UE, D2D specific barring parameters from a network, and checking, by the UE, whether access to a cell is allowed according to the received D2D specific barring parameters.

In another aspect, a user equipment (UE) is provided. The UE includes a memory, a transceiver, and a processor coupled to the memory and the transceiver, and configured to receive device-to-device (D2D) specific barring parameters from a network, and check whether access to a cell is allowed according to the received D2D specific barring parameters.

D2D specific access control can be performed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA.

The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
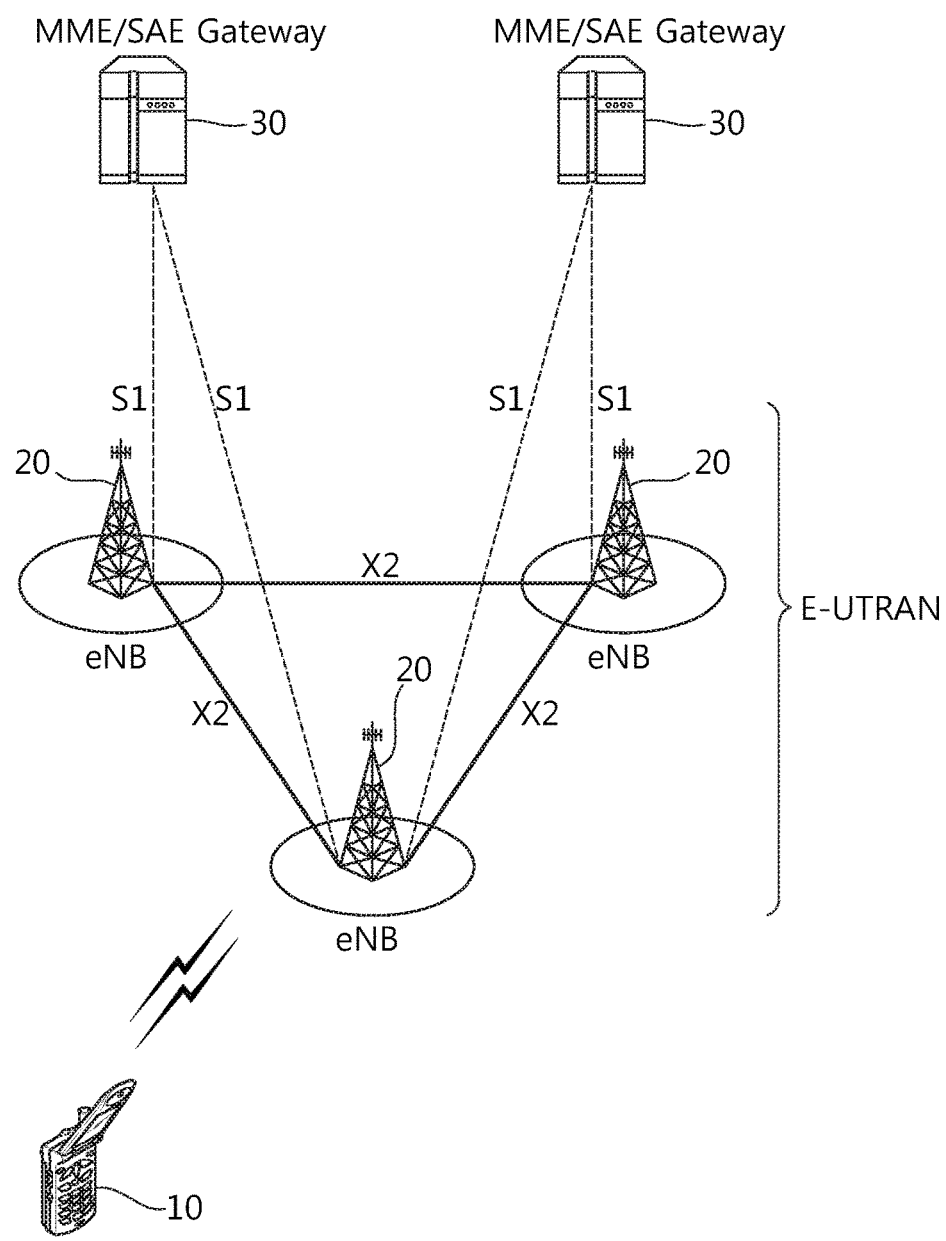
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
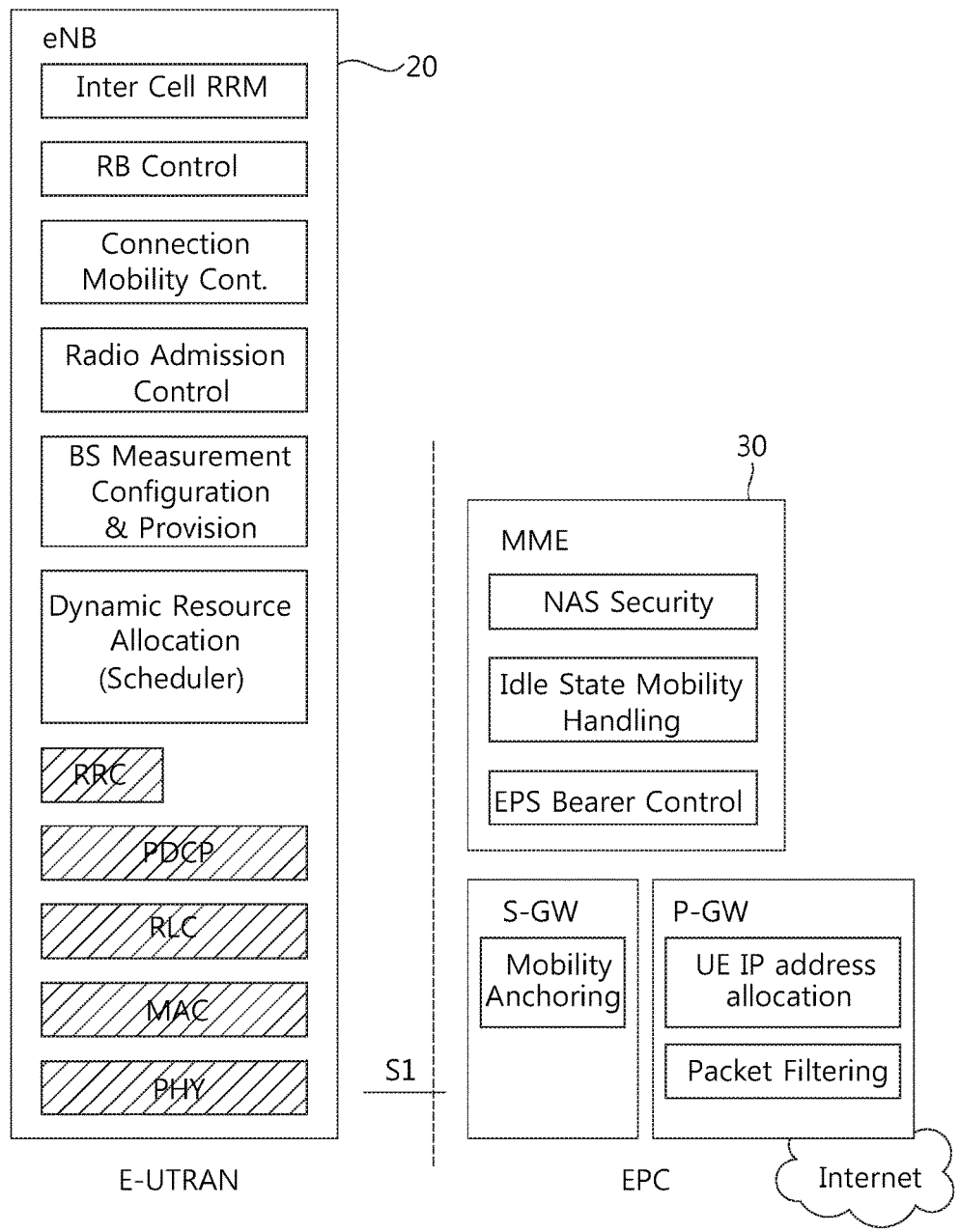
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
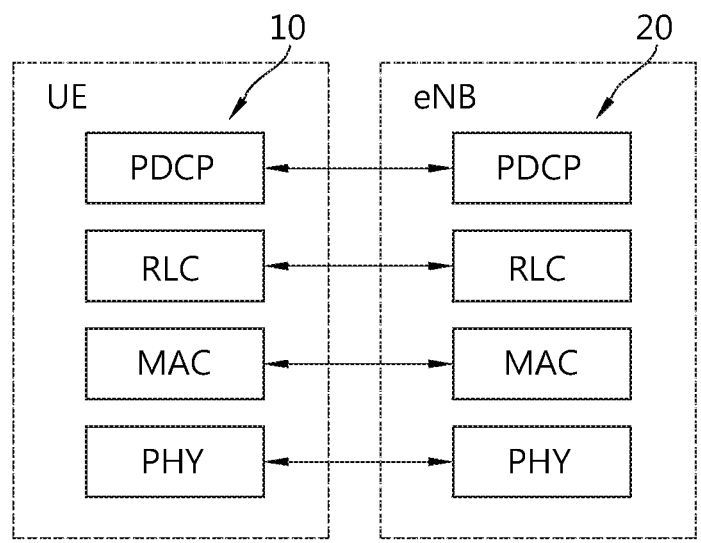
FIG. 3 shows a block diagram of a user plane protocol stack of an LTE system.
Figure 4:
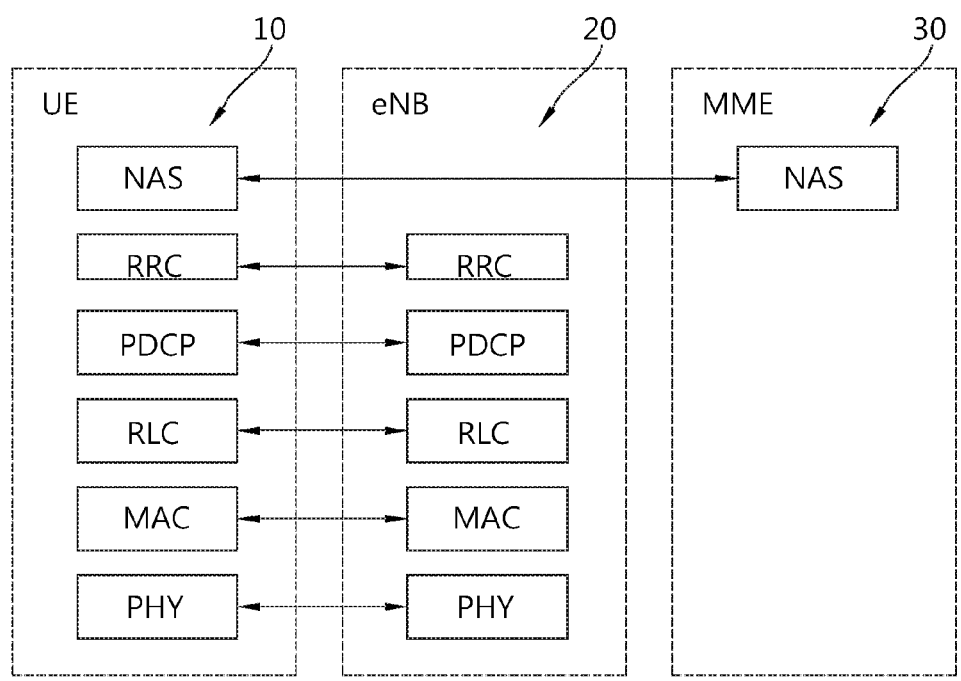
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
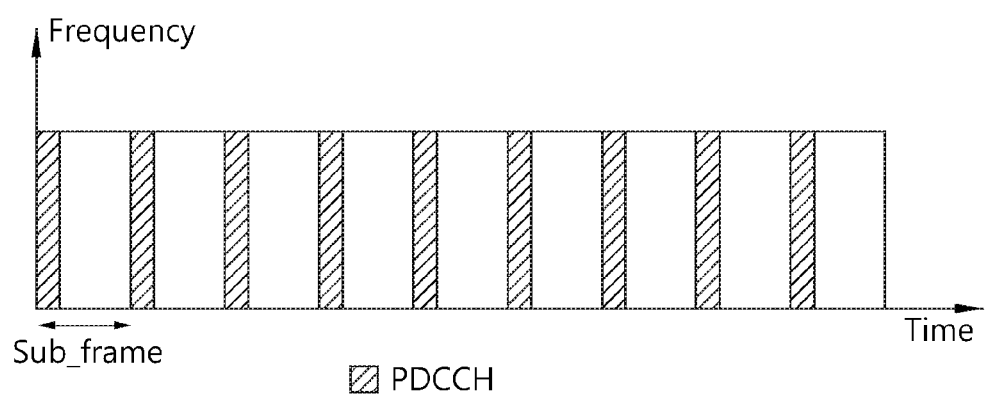
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Figure 6:
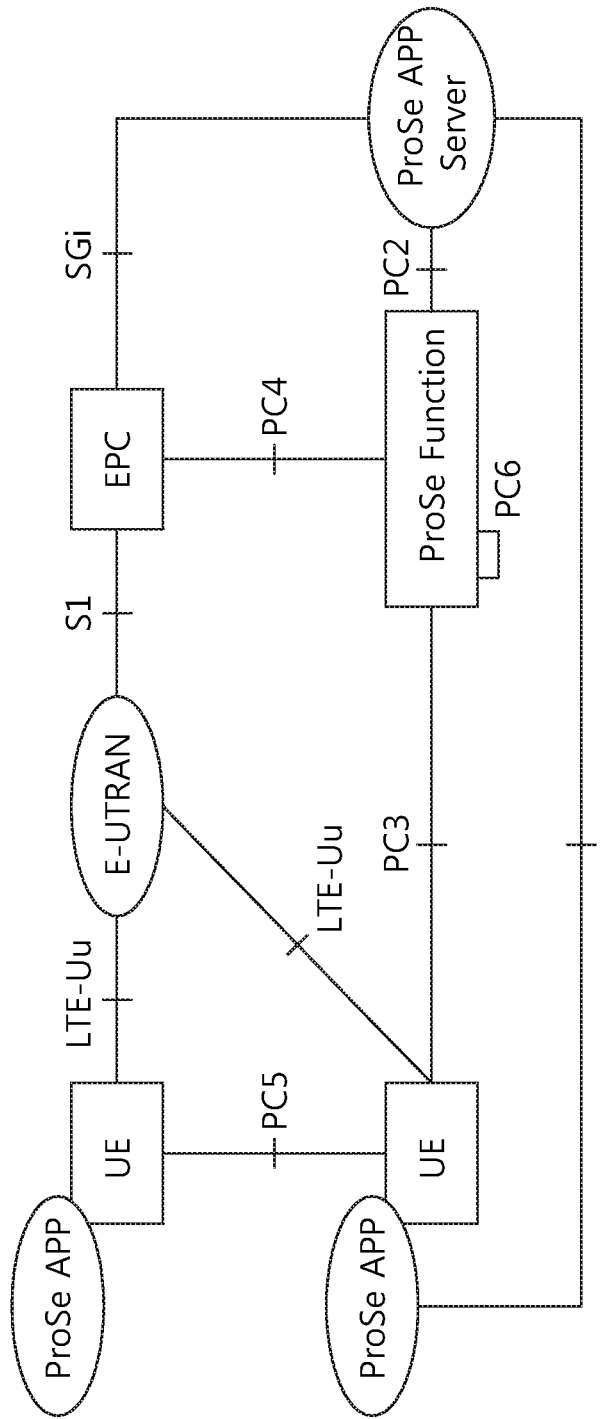
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging) Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
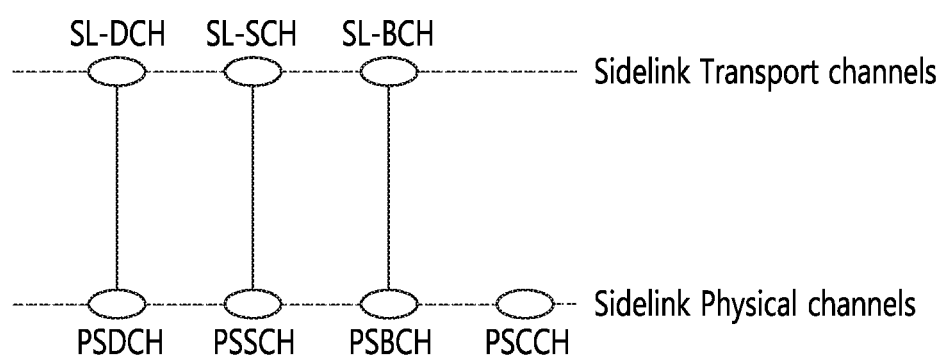
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
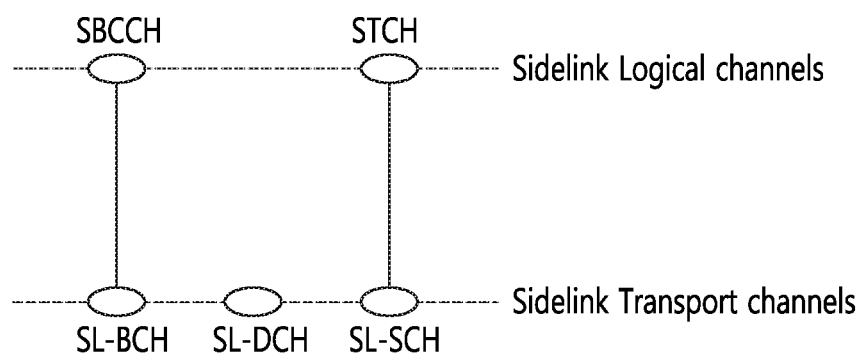
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise the UE uses pre-configured parameters. There is only one subframe every 40 ms for synchronization signal and SBCCH transmission for in-coverage operation. SIB 18 provides the resource information for synchronization signal and SBCCH transmission. There are two pre-configured subframes every 40 ms for out of coverage operation. The UE receives synchronization signal and SBCCH in one subframe and transmit synchronization signal and SBCCH on another subframe if UE becomes synchronization source based on defined criterion.

The UE performs Prose direct communication on subframes defined over the duration of sidelink control period. The sidelink control period is the period over which resources allocated in a cell for sidelink control and sidelink data transmissions occur. Within the sidelink control period the UE sends a sidelink control followed by data. Sidelink control indicates a layer 1 ID and characteristics of the transmissions (e.g. MCS, location of the resource(s) over the duration of sidelink control period, timing alignment).

The UE performs transmission and reception of Uu and PC5 with the following decreasing priority order:
Uu transmission/reception (highest priority);
PC5 ProSe direct communication transmission/reception;
PC5 ProSe direct discovery transmission/reception (lowest priority).

The UE supporting ProSe direct communication can operate in two modes for resource allocation. First is scheduled resource allocation (hereinafter, D2D mode 1), in which the UE needs to be RRC_CONNECTED in order to transmit data, and the UE requests transmission resources from the eNB. The eNB schedules transmission resources for transmission of sidelink control and data. The UE sends a scheduling request (dedicated SR or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identity (SL-RNTI). Second is UE autonomous resource selection (hereinafter, D2D mode 2), in which the UE on its own selects resources from resource pools to transmit sidelink control and data.

The UE in RRC_CONNECTED may send the ProSe direct indication to the eNB when the UE becomes interested in ProSe direct communication. In response eNB may configure the UE with a SL-RNTI. The UE is considered in-coverage for ProSe direct communication whenever it detects a cell on a public safety ProSe carrier. The following rules apply for the UE:

If the UE is out of coverage, it can only use UE autonomous resource selection;

If the UE is in coverage, it may use scheduled resource allocation or autonomous resource selection as per eNB configuration;

If the UE is in coverage, it shall use only the resource allocation mode indicated by eNB configuration unless one of the exceptional cases occurs. When an exceptional case occurs, the UE is allowed to use UE autonomous resource selection temporarily even though it was configured to use scheduled resource allocation. Resource pool to be used during exceptional case may be provided by the eNB.

The resource pools for sidelink control when the UE is out of coverage are configured as below:
The resource pool used for reception is pre-configured;
The resource pool used for transmission is pre-configured.
The resource pools for sidelink control when the UE is in coverage are configured as below:
The resource pool used for reception is configured by the eNB via RRC, in broadcast signaling;
The resource pool used for transmission is configured by the eNB via RRC, in dedicated or broadcast signaling, if UE autonomous resource selection is used;
The resource pool used for transmission is configured by the eNB via RRC, in dedicated signaling if scheduled resource allocation is used;
The eNB schedules the specific resource(s) for sidelink control transmission within the configured reception pool.

In order to perform communication even when some UEs are in-coverage and some UEs are out of coverage, all UEs (i.e. both in and out of coverage) should be configured with resource pools for sidelink control which is the union of the resource pools used for transmission of sidelink control in neighbor cells and transmission of sidelink control resource pool out of coverage.

The resource pools for data when the UE is out of coverage are configured as below:
The resource pool used for reception is pre-configured;
The resource pool used for transmission is pre-configured.
The resource pools for data when the UE is in coverage are configured as below:
The resource pools used for transmission and reception are configured by the eNB via RRC, in dedicated or broadcast signaling, if UE autonomous resource selection is used;
There is no resource pool for transmission if scheduled resource allocation is used.

Service specific access control (SSAC) in multimedia telephony (MMTEL) layer is described. It may be referred to Annex J.2.1.1 of 3GPP TS 24.173 V11.2.0 (2012-03). The following information is provided by lower layer:
BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish a MMTEL communication session, the UE shall:
1> if the MMTEL communication session to be established is an emergency session, then skip the rest of steps below and continue with session establishment;
2> retrieve SSAC related information mentioned above from lower layers;
3> if video is offered in the multimedia telephony communication session:

A> if back-off timer Tx is running, reject the MMTEL communication session establishment and skip the rest of steps below; or B> else, then:

I> draw a new random number "rand1" that is uniformly distributed in the range 0≤rand1<1; and II> if the random number "rand1" is lower than BarringFactorForMMTEL-Video, then skip the rest of steps below and continue with session establishment;

III> else, then;

i> draw a new random number "rand2" that is uniformly distributed in the range 0≤rand2<1; and ii> start back-off timer Tx with the timer value calculated using the formula:

$$Tx=(0.7+0.6*rand2)*BarringTimeForMMTEL\text{-}Video;$$
and iii> reject the multimedia telephony communication session establishment and skip the rest of steps below;

4> if audio is offered in the MMTEL communication session:

A> if back-off timer Ty is running, reject the MMTEL communication session establishment and skip the rest of steps below; or B> else, then;

I> draw a new random number "rand3" that is uniformly distributed in the range 0≤rand3<1; and II> if the random number "rand3" is lower than BarringFactorForMMTEL-Voice, then skip the rest of steps below and continue with session establishment;

III> else, then;

i> draw a new random number "rand4" that is uniformly distributed in the range 0≤rand4<1; and ii> start timer Ty with the timer value calculated using the formula:

$$Ty=(0.7+0.6*rand4)*BarringTimeForMMTEL\text{-}Voice;$$
and iii> reject the multimedia telephony communication session establishment;

If the MMTEL communication implementation and the access stratum protocol implementation are located in separate physical entities, it is expected that the interconnecting protocol supports the transfer of information elements needed for the SSAC enforcement.

SSAC is not activated when the UE is in other radio accesses (e.g., UTRAN/GERAN). And when the UE camping on E-UTRAN moves to other radio accesses (e.g., UTRAN/GERAN), back-off timer (Tx or Ty or both) shall be stopped if running Handling of SSAC related parameters is described. It may be referred to Section 5.3.3.10 of 3GPP TS 36.331 V11.0.0 (2012-06). Upon request from the upper layers, the UE shall:

1> set the local variables BarringFactorForMMTEL-Voice and BarringTimeForMMTEL-Voice as follows:

2> if the UE is in RRC_IDLE and ssac-BarringForMMTEL-Voice is present:

3> if the UE has one or more access classes (ACs), as stored on the universal subscriber identification module (USIM), with a value in the range 11.15, which is valid for the UE to use (ACs 12, 13, 14 are only valid for use in the home country and ACs 11, 15 are only valid for use in the home PLMN (HPLMN)/equivalent HPLMN (EHPLMN)), and 3> if, for at least one of these access classes, the corresponding bit in the ac-BarringForSpecialAC contained in ssac-BarringForMMTEL-Voice is set to zero:

4> set BarringFactorForMMTEL-Voice to one and BarringTimeForMMTEL-Voice to zero;

3> else:

4> set BarringFactorForMMTEL-Voice and BarringTimeForMMTEL-Voice to the value of ac-BarringFactor and ac-Barring Time included in ssac-BarringForMMTEL-Voice, respectively;

2> else set BarringFactorForMMTEL-Voice to one and BarringTimeForMMTEL-Voice to zero;

1> set the local variables BarringFactorForMMTEL-Video and BarringTimeForMMTEL-Video as follows:

2> if the UE is in RRC_IDLE and ssac-BarringForMMTEL-Video is present:

3> if the UE has one or more access classes, as stored on the USIM, with a value in the range 11.15, which is valid for the UE to use, and 3> if, for at least one of these access classes, the corresponding bit in the ac-BarringForSpecialAC contained in ssac-BarringForMMTEL-Video is set to zero:

4> set BarringFactorForMMTEL-Video to one and BarringTimeForMMTEL-Video to zero;

3> else:

4> set BarringFactorForMMTEL-Video and BarringTimeForMMTEL-Video to the value of ac-BarringFactor and ac-Barring Time included in ssac-BarringForMMTEL-Video, respectively;

2> else set BarringFactorForMMTEL-Video to one and BarringTimeForMMTEL-Video to zero;

1> forward the variables BarringFactorForMMTEL-Voice, BarringTimeForMMTEL-Voice, BarringFactorForMMTEL-Video and BarringTimeForMMTEL-Video to the upper layers;

Access class barring (ACB) check is described. It may be referred to Section 5.3.3.11 of 3GPP TS 36.331 V11.0.0 (2012-06).

1> if timer T302 or "Tbarring" is running:

2> consider access to the cell as barred;

1> else if SystemInformationBlockType2 includes "AC barring parameter":

2> if the UE has one or more ACs, as stored on the USIM, with a value in the range 11.15, which is valid for the UE to use (ACs 12, 13, 14 are only valid for use in the home country and ACs 11, 15 are only valid for use in the HPLMN/EHPLMN), and 2> for at least one of these valid access classes the corresponding bit in the ac-BarringForSpecialAC contained in "AC barring parameter" is set to zero:

3> consider access to the cell as not barred;

2> else:

3> draw a random number 'rand' uniformly distributed in the range: 0≤rand<1;

3> if 'rand' is lower than the value indicated by ac-BarringFactor included in "AC barring parameter":

4> consider access to the cell as not barred;

3> else:

4> consider access to the cell as barred;

1> else:

2> consider access to the cell as not barred;

1> if access to the cell is barred and both timers T302 and "Marring" are not running:

2> draw a random number 'rand' that is uniformly distributed in the range 0≤rand<1;

2> start timer "Marring" with the timer value calculated as follows, using the ac-BarringTime included in "AC barring parameter":

$$\text{"}Tbarring\text{"}=(0.7+0.6*rand)*ac\text{-}BarringTime.$$

The SystemInformationBlockType2 IE (hereinafter, SIB2) contains radio resource configuration information that is common for all UEs. Table 1 shows an example of the SIB2. The SIB2 includes parameters for the SSAC and ACB described above.

TABLE 1

```
-- ASN1START
SystemInformationBlockType2 ::=    SEQUENCE {
    ac-BarringInfo                  SEQUENCE {
    ac-BarringForEmergency          BOOLEAN,
        ac-BarringForMO-Signalling      AC-BarringConfig        OPTIONAL,
-- Need OP
        ac-BarringForMO-Dat             AC-BarringConfig        OPTIONAL
-- Need OP
    }
OPTIONAL,       -- Need OP
    radioResourceConfigCommon       RadioResourceConfigCommonSIB,
    ue-TimersAndConstants           UE-TimersAndConstants,
    freqInfo                        SEQUENCE {
        ul-CarrierFreq                          ARFCN-ValueEUTRA
OPTIONAL,      -- Need OP
        ul-Bandwidth                ENUMERATED {n6, n15, n25, n50, n75, n100}
                                                                OPTION
AL,     -- Need OP
        additionalSpectrumEmission  AdditionalSpectrumEmission
    },
    mbsfn-SubframeConfigList                    MBSFN-SubframeConfigList
OPTIONAL,      -- Need OR
    timeAlignmentTimerCommon        TimeAlignmentTimer,
    ...,
    lateNonCriticalExtension        OCTET     STRING    (CONTAINING
SystemInformationBlockType2-v8h0-IEs)
                                                                OPTION
AL,     -- Need OP
    [[ ssac-BarringForMMTEL-Voice-r9    AC-BarringConfig        OPTIONAL,
-- Need OP
        ssac-BarringForMMTEL-Video-r9   AC-BarringConfig        OPTIONAL
-- Need OP
    ]],
    [[ ac-BarringForCSFB-r10            AC-BarringConfig        OPTIONAL
-- Need OP
    ]]
}
SystemInformationBlockType2-v8h0-IEs ::=    SEQUENCE {
    multiBandInfoList           SEQUENCE (SIZE (1..maxMultiBands)) OF
AdditionalSpectrumEmission
                                                                OPTION
AL,     -- Need OR
    nonCriticalExtension        SystemInformationBlockType2-v9e0-IEs   OPTIONAL
-- Need OP
}
SystemInformationBlockType2-v9e0-IEs ::= SEQUENCE {
    ul-CarrierFreq-v9e0                         ARFCN-ValueEUTRA-v9e0
OPTIONAL, -- Cond ul-FreqMax
    nonCriticalExtension        SEQUENCE { }    OPTIONAL
        -- Need OP
}
AC-BarringConfig ::=   SEQUENCE {
    ac-BarringFactor    ENUMERATED {
                            p00, p05, p10, p15, p20, p25, p30, p40,
                            p50, p60, p70, p75, p80, p85, p90, p95},
    ac-BarringTime      ENUMERATED {s4, s8, s16, s32, s64, s128, s256, s512},
    ac-BarringForSpecialAC BIT STRING (SIZE(5))
}
MBSFN-SubframeConfigList  ::=SEQUENCE (SIZE (1..maxMBSFN-Allocations)) OF
MBSFN-SubframeConfig
-- ASN1STOP
```

Referring to Table 1, the ac-BarringFactor field indicates a referece for ACB. If the random number drawn by the UE is lower than this value, access is allowed. Otherwise the access is barred. The ac-BarringForCSFB field indicates ACB for mobile originating (MO) circuit-switch (CS) fallback. The ac-BarringForEmergency field indicates ACB for AC 10. The ac-BarringForMO-Data field indicates ACB for MO calls. The ac-BarringForMO-Signalling field indicates ACB for MO signaling. The ac-BarringForSpecialAC field indicates ACB for AC 11-15. The first/leftmost bit is for AC 11, the second bit is for AC 12, and so on. The ac-BarringTime field indicates access barring time value in seconds. The ssac-BarringForMMTEL-Video field indicates SSAC for MMTEL video originating calls. The ssac-BarringForMMTEL-Voice field indicates SSAC for MMTEL voice originating calls.

Hereinafter, a method for performing D2D specific access control according to an embodiment of the present invention is described. According to an embodiment of the present invention, D2D specific barring parameters are defined, and according to the D2D specific barring parameters, D2D specific access control may be performed.

Figure 9:
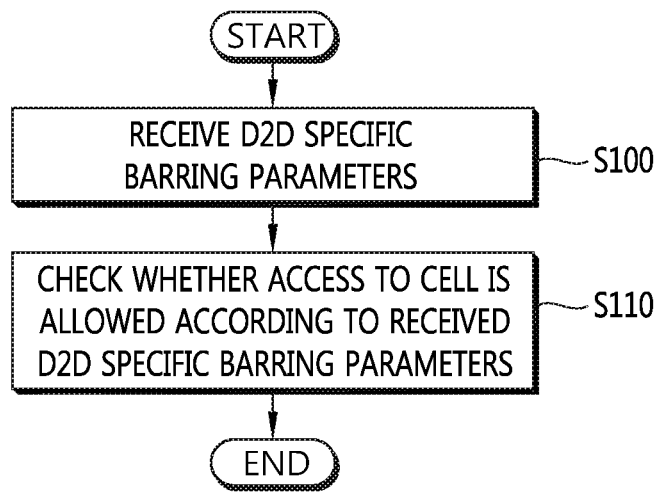
FIG. 9 shows an example of a method for performing D2D specific access control according to an embodiment of the present invention.

FIG. 9 shows an example of a method for performing D2D specific access control according to an embodiment of the present invention. It is assumed that the UE camps on a cell, and detects user traffic to be transmitted over the direct interface among UEs.

In step S100, the UE, which is in RRC_IDLE or RRC_CONNECTED, receives D2D specific barring parameters. The D2D specific barring parameters may be received via system information for D2D operation. The D2D specific barring parameters may correspond to one of ACB function, SSAC function, extended access barring (EAB) function, or D2D specific access control function. Various examples for the D2D specific barring parameters are described as follows.

1) The D2D specific barring parameters may include a D2D specific barring factor and a D2D specific barring time. If the UE performs D2D transmission or D2D reception, the UE may considers these parameters as the corresponding parameters.

2) The D2D specific barring parameters may include a first set of D2D specific barring parameters for D2D mode 1 and a second set of D2D specific barring parameters for D2D mode 2, respectively. That is, the D2D specific barring parameters may include D2D mode 1 specific barring factor/time and D2D mode 2 specific barring factor/time. If the UE performs D2D transmission or D2D reception in D2D mode 1, the UE may consider these parameters as the corresponding parameters. If the UE performs D2D transmission or D2D reception in D2D mode 2, the UE may consider these parameters as the corresponding parameters.

3) The D2D specific barring parameters may include different sets of D2D specific barring parameters for different D2D services/applications, respectively. That is, the D2D specific barring parameters may include different D2D related service/application specific barring factor/time, e.g. D2D voice service specific barring factor/time and D2D non-voice service specific barring factor/time, etc. If the UE performs D2D transmission or D2D reception for a specific service/application, the UE may consider these parameters corresponding to the specific service/application as the corresponding parameters.

4) The D2D specific barring parameters may include a first set of D2D specific barring parameters for D2D transmission and a second set of D2D specific barring parameters for D2D reception, respectively. That is, the D2D specific barring parameters may include D2D specific barring factor/time for UEs performing D2D transmission and D2D specific barring factor/time for UEs performing D2D reception. If the UE performs D2D transmission, the UE may consider these parameters as the corresponding parameters. If the UE performs D2D reception, the UE may consider these parameters as the corresponding parameters.

In step S110, the UE checks whether access to a cell is allowed according to the received D2D specific barring parameters. When the UE in RRC_IDLE camps on a cell, when the UE moves to RRC_IDLE, when the UE in RRC_IDLE or RRC_CONNECTED determines start of D2D transmission or D2D reception, or when the UE performs handover to a target cell, the UE in RRC_IDLE or in RRC_CONNECTED performs D2D specific barring check based on the received D2D specific barring parameters in ACB function, SSAC function, EAB function, or D2D specific access control function. More specifically, a UE entity, such as RRC, NAS, IP multimedia subsystem (IMS) or MMTEL, receives the D2D specific barring factor(s)/time(s) from a serving cell, as described above, and draws a random number and compares the random number with the corresponding barring factor parameter. Based on the comparison, the UE determines whether access to the cell is allowed or not.

If the access to the cell is allowed, the UE may transmit a connection request to the cell. If the access to the cell is allowed, the UE in RRC_IDLE may transmit random access preamble to the eNB. If the access to the cell is allowed, the UE in RRC_CONNECTED may transmit a SR or BSR to the eNB.

If the access to the cell is not allowed, the UE in RRC_IDLE may start a timer for the corresponding barring time in the D2D specific barring parameters. While the timer is running, the UE in RRC_IDLE may consider that the RRC connection establishment is not allowed until the timer expires. If the access to the cell is not allowed, the UE in RRC_CONNECTED may also start a timer for the corresponding barring time in the D2D specific barring parameters. While the timer is running, the UE in RRC_CONNECTED may not transmit a SR or BSR to the eNB until the timer expires. Alternatively, if the access to the cell is not allowed, the UE in RRC_CONNECTED may release the current RRC connection and/or request a RRC connection release to the eNB by indicating D2D purpose to the eNB.

Figure 10:
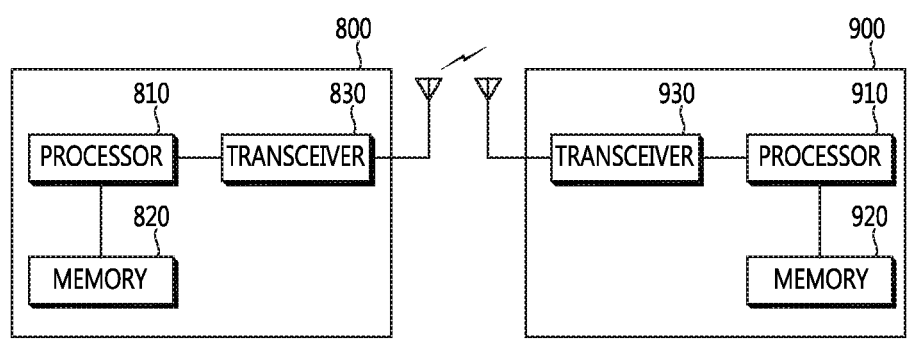
FIG. 10 shows a wireless communication system to implement an embodiment of the present invention.

FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), a device-to-device (D2D) specific access control in a wireless communication system, the method comprising:
  receiving, by the UE from a network, D2D specific barring parameters which are used to check whether or not the UE performing a D2D transmission or a D2D reception is allowed to access a cell;
  performing, by the UE, the D2D transmission or the D2D reception;
  while performing the D2D transmission or the D2D reception, checking, by the UE, whether or not the UE is allowed to access the cell based on the received D2D specific barring parameters;
  if the checking reveals that the UE is allowed to access the cell, transmitting, by the UE, at least one of a random access preamble, a scheduling request (SR), a buffer status report (BSR) or a radio resource control (RRC) connection request, to the network; and
  if the checking reveals that the UE is not allowed to access the cell, barring, by the UE, transmission of the random access preamble, transmission of the SR, transmission of the BSR and transmission of the RRC connection request, to the network.

2. The method of claim 1, wherein the D2D specific barring parameters include a D2D specific barring factor and a D2D specific barring time.

3. The method of claim 1, wherein the D2D specific barring parameters include a first set of D2D specific barring parameters for D2D mode 1 and a second set of D2D specific barring parameters for D2D mode 2.

4. The method of claim 1, wherein the D2D specific barring parameters include different sets of D2D specific barring parameters for different D2D services or applications, respectively.

5. The method of claim 1, wherein the D2D specific barring parameters include a first set of D2D specific barring parameters for D2D transmission and a second set of D2D specific barring parameters for D2D reception.

6. The method of claim 1, wherein the D2D specific barring parameters are received via system information for D2D operation.

7. The method of claim 1, wherein the D2D specific barring parameters correspond to at least one of an access class barring (ACB) function, a service specific access control (SSAC) function, an extended access barring (EAB) function, or a D2D specific access control function.

8. The method of claim 1, further comprising:
  starting a timer,
  wherein the transmission of the random access preamble, transmission of the SR, transmission of the BSR and transmission of the RRC connection request are barred while the timer is running.

9. The method of claim 1, further comprising:
  if the checking reveals that the UE is not allowed to access the cell, releasing a RRC connection or requesting release of the RRC connection.

10. A user equipment (UE), comprising:
  a memory;
  a transceiver; and
  a processor, coupled to the memory and the transceiver, that:
    receives, from a network, D2D specific barring parameters which are used to check whether or not the UE performing a D2D transmission or a D2D reception is allowed to access a cell;
    performs the D2D transmission or the D2D reception;
    while performing the D2D transmission or the D2D reception, checks whether or not the UE is allowed to access the cell based on the received D2D specific barring parameters;
  if the checking reveals that the UE is allowed to access the cell, transmits at least one of a random access preamble, a scheduling request (SR), a buffer status report (BSR) or a radio resource control (RRC) connection request, to the network; and
  if the checking reveals that the UE is not allowed to access the cell, bars transmission of the random access preamble, transmission of the SR, transmission of the BSR and transmission of the RRC connection request, to the network.

* * * * *